(12) United States Patent
Sundvik et al.

(10) Patent No.: US 8,029,585 B2
(45) Date of Patent: Oct. 4, 2011

(54) POCKET FILTER ASSEMBLY

(75) Inventors: Anders Sundvik, Hägersten (SE);
Kjell-Åke Enbom Ernst, Trosa (SE)

(73) Assignee: Camfil AB, Trosa (SE)

( * ) Notice: Subject to any disclaimer, the term of this patent is extended or adjusted under 35 U.S.C. 154(b) by 595 days.

(21) Appl. No.: 11/920,623

(22) PCT Filed: May 22, 2006

(86) PCT No.: PCT/SE2006/000591
§ 371 (c)(1),
(2), (4) Date: Apr. 14, 2008

(87) PCT Pub. No.: WO2006/126937
PCT Pub. Date: Nov. 30, 2006

(65) Prior Publication Data
US 2009/0107088 A1 Apr. 30, 2009

(30) Foreign Application Priority Data
May 23, 2005 (SE) .................... 0501146

(51) Int. Cl.
*B01D 46/00* (2006.01)
(52) U.S. Cl. ........... 55/378; 55/483; 55/484; 55/508; 55/DIG. 12; 55/DIG. 31
(58) Field of Classification Search .......... 55/379, 55/483, 484, 492, 506, 508, DIG. 12, DIG. 31, 55/368, 378
See application file for complete search history.

(56) References Cited

U.S. PATENT DOCUMENTS 3,834,134 A * 9/1974 McAllister ............ 55/378
4,197,099 A * 4/1980 Lundberg ............ 55/378
4,312,648 A * 1/1982 Day .................. 55/378
4,325,718 A  4/1982 Burkhead
(Continued)

FOREIGN PATENT DOCUMENTS
DE 93 15 694.4 3/1994
(Continued)

OTHER PUBLICATIONS

English translation of Office Action mailed Feb. 22, 2011, in corresponding Japanese Patent Application No. 2008-513409.
(Continued)

*Primary Examiner* — Duane Smith
*Assistant Examiner* — Minh-Chau Pham
(74) *Attorney, Agent, or Firm* — Harness, Dickey & Pierce, P.L.C.

(57) ABSTRACT

A pocket filter assembly includes a frame structure having a plurality of filter pocket openings and a corresponding plurality of filter pockets, each filter pocket having a pocket mouth securely sealed in a corresponding filter pocket opening. The frame structure includes an outer subframe and a corresponding inner subframe connected and locked to each other by means of locking elements at locking positions distributed along opening portions of the subframes defining the filter pocket openings. At each locking position, the filter pocket mouths are sealed clamped and sealed between co-operating opening portions of the subframes. The locking elements include an undercut hook-shaped projection on the inner subframe and a co-operating receiving hole on the outer subframe, such that an interlock of the subframes to each other is obtained, while including filter pocket mouth material of the associated filter pocket between said projection and said aperture such that said interlock is sealed thereby.

21 Claims, 8 Drawing Sheets

U.S. PATENT DOCUMENTS

| | | | |
|---|---|---|---|
| 4,356,011 A * | 10/1982 | Day et al. | 55/368 |
| 5,298,044 A | 3/1994 | Sutton et al. | |
| 5,554,203 A * | 9/1996 | Borkent et al. | 55/378 |
| 5,695,535 A * | 12/1997 | Hintenlang et al. | 55/379 |
| 5,914,413 A * | 6/1999 | Andersson et al. | 55/378 |
| 6,451,079 B1 * | 9/2002 | Lange et al. | 55/379 |

FOREIGN PATENT DOCUMENTS

| | | |
|---|---|---|
| DE | 9315694 | 3/1994 |
| EP | 0666096 | 8/1995 |
| FR | 2 093 858 | 1/1972 |
| GB | 1 355 531 | 6/1974 |
| JP | UM-A-51-066288 | 11/1974 |
| JP | UM-A-01-148720 | 10/1989 |
| JP | UM-A-04-9619 | 1/1992 |
| JP | 2002-006085 | 6/2000 |
| JP | 2002-006085 | 1/2002 |
| JP | 2005-028219 | 2/2005 |
| WO | 96/02138 | 2/1996 |
| WO | WO 98/37945 | 9/1998 |
| WO | 99/36155 | 7/1999 |

OTHER PUBLICATIONS

Extended European Search Report dated Jul. 17, 2009 for corresponding European Application No. 06733422.7-2113.

* cited by examiner

POCKET FILTER ASSEMBLY

FIELD OF THE INVENTION

The invention relates to a pocket filter assembly for removing contaminations, such as particles or gaseous contaminations, from an air or gas flow, comprising a frame structure having a number of filter pocket openings with a corresponding number of filter pockets. Each filter pocket has a pocket mouth sealingly secured in a corresponding filter pocket opening. The frame structure comprises an outer subframe and a corresponding inner subframe connected and locked to each other, the filter pocket mouths being sealingly clamped between co-operating opening portions of the subframes.

BACKGROUND ART

U.S. Pat. No. 5,554,203 discloses a filter element of the general kind defined above. The filter element comprises a main stiff support frame including the frame itself and traversing bars or ribs which define filter pocket openings. The main support frame is built of an exterior subframe that snugly fits over an interior subframe. The edges of the filter pockets are inter-engaged by opposite subframe wall portions. The interfitting subframes are detachably connected one to another and to the filter pockets. On the outer periphery of the interior subframe there are a number of protrusions which can be snappingly locked into corresponding receiving openings provided in the outer periphery of the exterior subframe, enabling the interlocking engagement between the subframes to be easily unlocked for replacement of the filter pockets. In a preferred embodiment, the traversing bars or ribs of the subframes are also locked to each other by releasable security means, such as so-called magnetically operated security means.

OBJECTS AND SUMMARY OF THE INVENTION

The objects of the invention are to provide an improved pocket filter assembly of the above-mentioned general kind which is easy to produce, assemble and mount, has excellent sealing properties with regard to air or gas leakage and gives logistic advantages.

Example embodiments are directed to an improved pocket filter assembly which is relatively easy to produce, assemble and mount, has excellent sealing properties with regard to air or gas leakage and gives logistic advantages.

The invention is based on the insight that substantial advantages can be obtained by refraining from making the subframes detachably connected to each other and focussing the interconnection of the subframe to the opening portions of the subframes defining the filter pocket openings.

The inner subframe is provided within the outer subframe, that is, such that inner subframe portions are received in hollow outer subframe portions.

Suitably, the filter pocket openings of the hollow outer subframe are defined by channel portions of the subframe receiving corresponding portions of the inner subframe co-operating with the walls of said channel portions, while clamping clamped portions of the filter pocket mouths therebetween.

The clamped portions of the filter pocket mouths preferably extend generally in the direction of the air or gas flow through the corresponding filter pocket opening into the filter pocket.

According to the invention the subframes are connected and locked to each other at a plurality of distributed locking positions along the opening portions of the subframes defining said filter pocket openings. At each locking position there are locking elements on co-operating opening portions of the subframes comprising a projection on one of the subframes and a co-operating receiving aperture or recess on the other of the subframes such that an interlock of the subframes to each other is obtained, while involving filter pocket mouth material of the associated filter pocket between said projection and said aperture such that said interlock is sealed thereby. By involving filter pocket material in every interlock, that is, at every locking position, in addition to securing the necessary sealing of the interlock, an extra filter pocket holding effect is obtained. This is particularly pronounced when in accordance with a preferred embodiment the filter pocket material sealing an interlock is provided between the associated projection and co-operating aperture.

It is advantageous that the abovementioned locking elements are the sole locking elements for connecting and locking the subframes to each other. This means that the outer peripheral portions of the outer subframe do not need to be used for interconnection purposes but can be used for sealing purposes. For instance, the peripheral outer side surface can be substantially flat and unpenetrated such that it can be used as a sealing surface which is an advantage in many filter installations.

Also, since the outer peripheral portions of the subframes are not involved in the interlocking of the subframes, to advantage they can be used for providing gaskets on the pocket filter assembly. Thus, in an embodiment the outer subframe has a circumferential peripheral groove on the inlet front side of the assembly, a gasket being provided in the groove. In a further embodiment the inner subframe has a circumferential peripheral groove on the outlet rear side of the assembly, a gasket being provided in the groove. Such gaskets makes it easy to mount a pocket filter assembly according to the invention in a wellsealed manner where it is to be used.

The interlocking at the locking positions preferable includes a snapping action. Since the interlocking need not be detachable, it is preferred to have an interlocking of a non-detachable form-fit or undercut nature. To make it easy to assemble the assembly while using a snapping action, co-operating portions of the subframes involved should be suitably elastic or resilient, at least one thereof.

With regard to the locking elements, the receiving apertures or recesses, preferably being through-holes, can be provided in the outer subframe, while the projections are provided on the inner subrame, or vice versa. At present, the first alternative is however deemed to be preferred.

In an embodiment the projections each comprise a hook or hook end for co-operation with an associated receiving aperture or recess. Preferably, the hook end is undercut. Also, the receiving apertures each can have a correspondingly undercut abutment surface for cooperation with the undercut hook end of an associated projection. In this way a very secure and stable interlocking will be obtained.

The receiving apertures suitably can be throughholes in opening portions of the outer subframe while said hook ends project sideways from corresponding opening portions of the inner subframe, or vice versa.

In an embodiment the outer subframe is generally flat and has frame portions having an essentially U-shaped cross section with an opened interior space facing and expanding downstreams—with regard to the diretion of the flow of air or gas through the pocket filter assembly. Those opened frame portions receive co-operating frame portions of the inner subframe while clamping filter pocket mouths there between. Such opened frame portions easily can be given appropriate elasticity or resiliency for enabling a snapping action when such is used for the interlock of the subframes.

In an embodiment the inner subframe comprises a base from which portions project upwards and into the interior space of associated frame portions of the outer subframe. Such upwards projecting portions are designed and have a profile such that a co-operation with inner wall surfaces of said interior space is obtained, enabling filter pocket mouths to be clamped therebetween.

With regard to non-peripheral subframe portions of the inner subframe, a portion projecting upwards from said base into an interior space of the associated outer subframe portion could be solid having sloping side wall surfaces for co-operating with corresponding sloping wall surfaces of said interior space. However, in order to save material and give elasticity when interlocking involving a snapping action is used, in a preferred embodiment the portion projection upwards is replaced by two separated flanges projecting upwards somewhat towards each other. With regard to peripheral portions of the inner subframe, only one flange projecting upwards is necessary for co-operation with a corresponding sloping inner wall surface of the associated peripheral portion of the outer subframe, leaving the outermost peripheral wall of the outer subframe unaffected of the interlocking of the subframes.

In an embodiment, both of the subframes are made in one piece, although it is conceivable to have the inner subframe divided into a number of parts. The subframes suitably are moulded of plastics material, making it very easy to produce the locking elements on the subframes.

The above-mentioned features and advantages, as well as other, will be more apparent when reading the following description of embodiments of the invention, with reference to the drawings.

DESCRIPTION OF EMBODIMENTS

Figure 1:
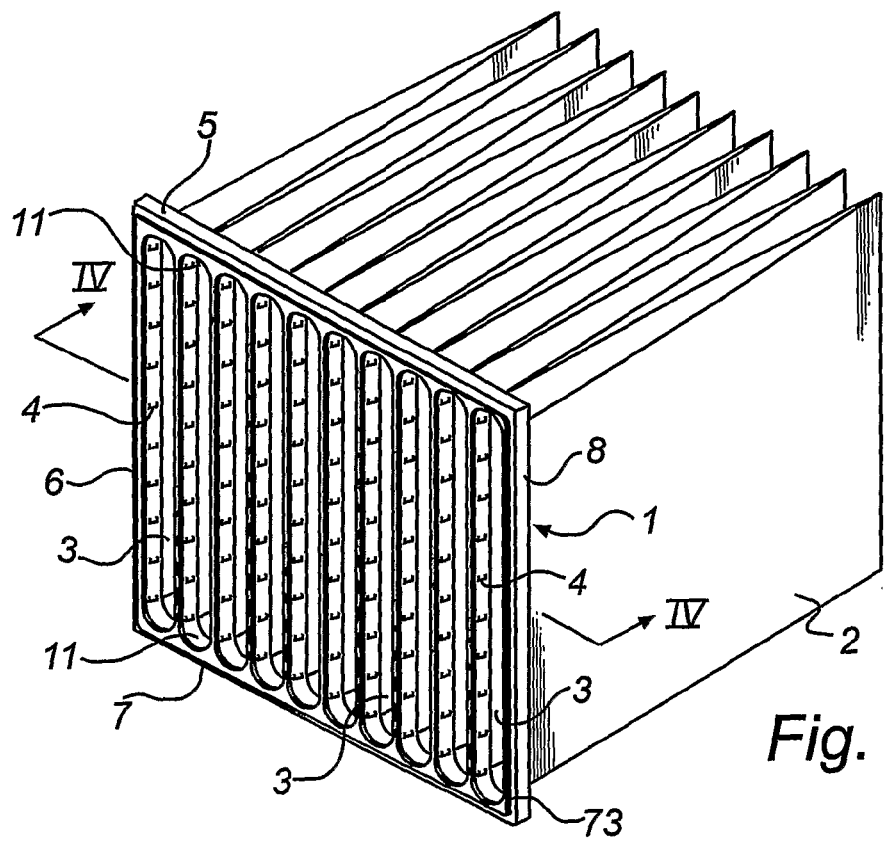
FIG. 1 is a schematic perspective front view of an embodiment of a pocket filter assembly according to the invention.
Figure 2:
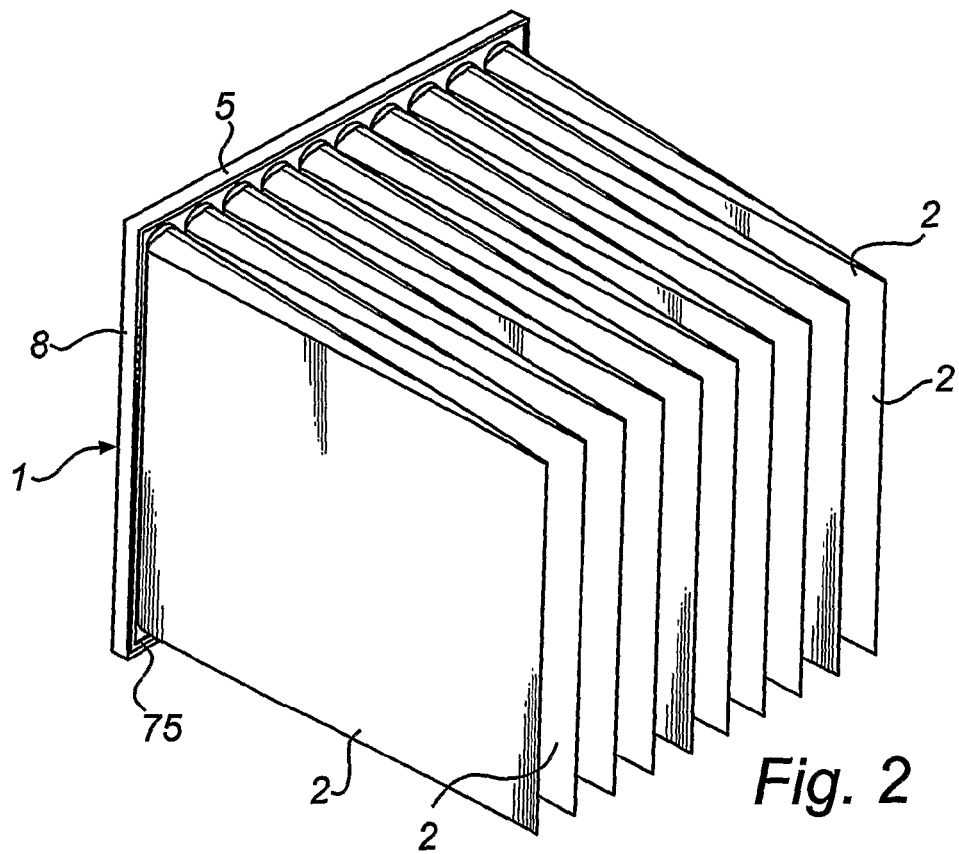
FIG. 2 is a schematic perspective view of the embodiment of FIG. 1 taken from behind, that is from the downstream side of the assembly.

The embodiments of a pocket filter assembly illustrated in the drawings comprise a frame structure 1 and a number of separate filter pockets 2 having their pocket mouths sealingly clamped at corresponding filter pocket openings 3 in the frame structure. The frame structure is rectangular and comprises four peripheral frame portions 5,6,7,8 and a number of frame ribs 9 extending separated and in parallel to each other between two opposite peripheral frame portions 5, 8, so as to define longitudinal filter pocket openings 3. The respective ends of the filter pocket openings 3 are rounded, as can be seen at 11. Consequently, the frame structure generally has the form of a flat grating or grid.

Figure 3:
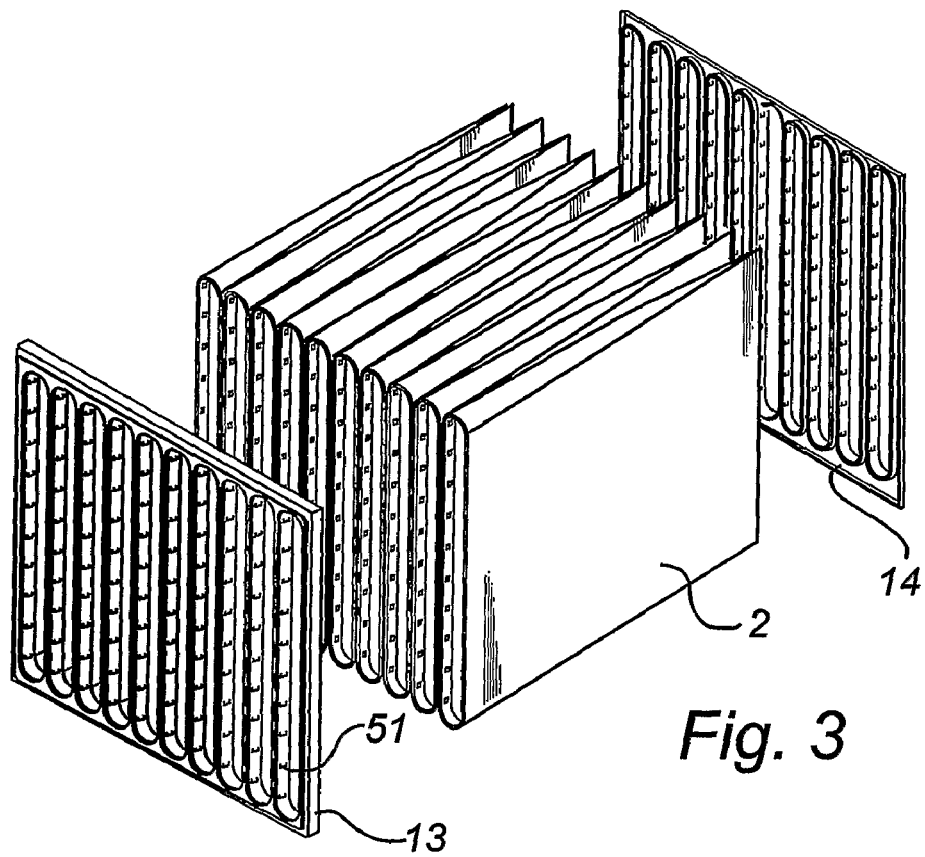
FIG. 3 is a schematic exploded perspective view of the embodiment of FIGS. 1 and 2.
Figure 4:
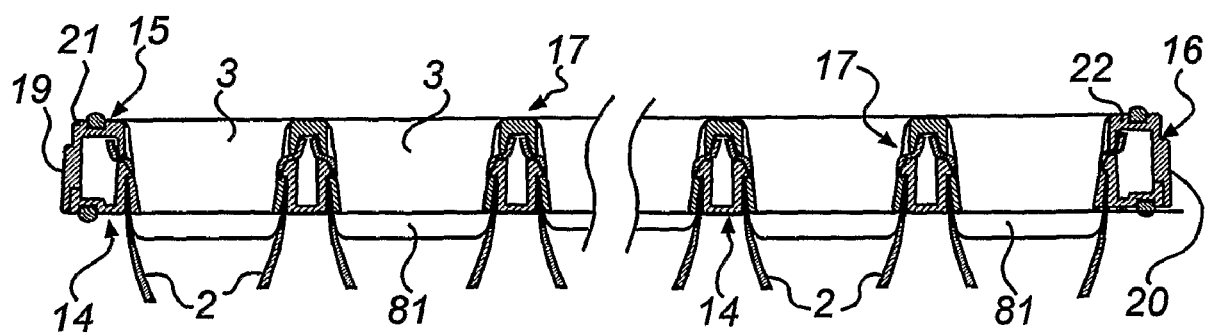
FIG. 4 is a schematic cross-sectional view in accordance with line IV-IV in FIG. 1, taken through locking positions.

The frame structure comprises an outer subframe 13 and a corresponding inner subframe 14, cf. FIGS. 3 and 4. The inner subframe 14 is positioned within the outer subframe—from behind, that is, from the downstream side with regard to the direction of the flow of air or gas that is to be passed through the pocket filter assembly and thus through the filter pockets 2. The mouths of the filter pocket are clamped between co-operating portions of the two subframes and also held by locking elements interlocking the subframes to each other, as will be discussed later on.

The outer subframe 13 comprises channel-like portions such as 15,16,17 each having a planar front surface in one and the same plane and an essentially U-shaped cross section with a downwardly (that is, facing downstreams) opened and downwardly somewhat expanding interior space. The peripheral subframe portions such as 15,16 have a substantially flat and unpenetrated outer side surface, such as 19,20 which is perpendicular to the associated front surface 21,22 respective.

Figure 5:
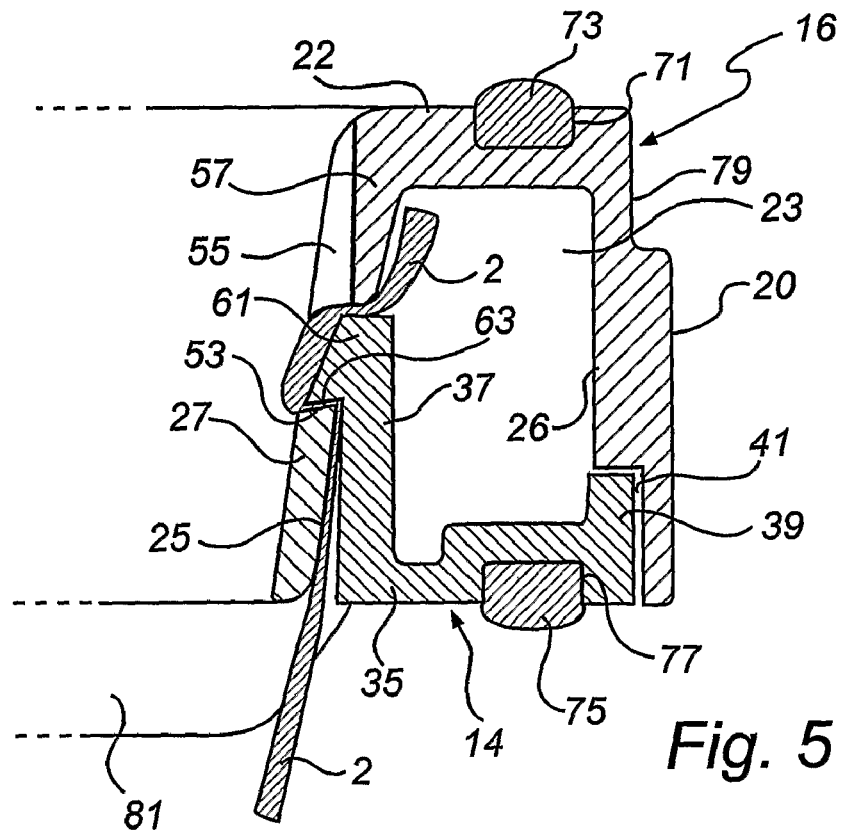
FIG. 5 is a schematic enlarged partial cross-sectional view of a peripheral interlocking of FIG. 4.
Figure 6:
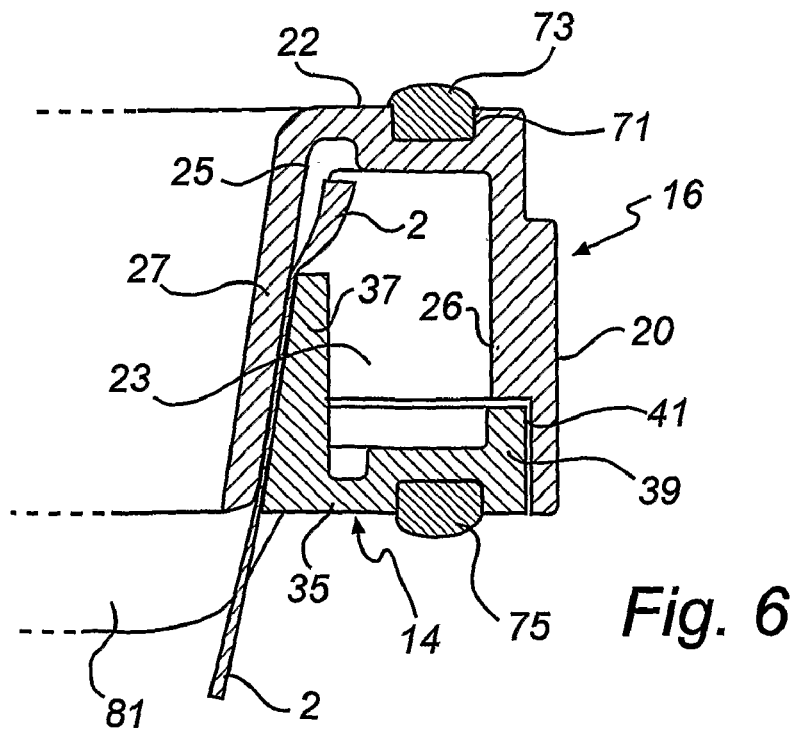
FIG. 6 is a schematic enlarged partial cross-sectional view similar to that of FIG. 5 but taken separated from a locking position.

With specific reference now to FIGS. 5 and 6, the interior space 23 of the peripheral outer subframe portions such as 16 expands or diverges downwardly since the surface 25 of inner wall or limb 27 on the inner side slopes inwards, that is, towards the axis of the pocket filter assembly, while the opposite outer wall surface 26 is substantially perpendicular to the front surface 22. A corresponding peripheral portion of the inner subframe 14 is received in the interior space 23 while clamping filter pocket mouth portions against said inner wall surface 25. The interlocking between the subframes (FIG. 5) will be described later on.

Figure 7:
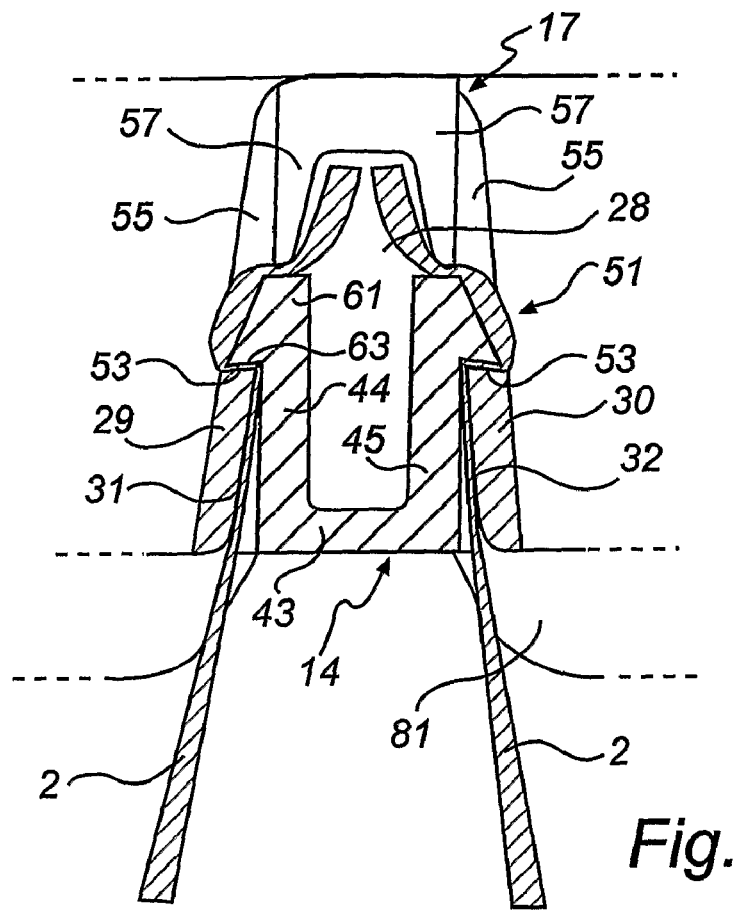
FIG. 7 is a schematic view similar to that of FIG. 5 but illustrating a non-peripheral interlocking.
Figure 8:
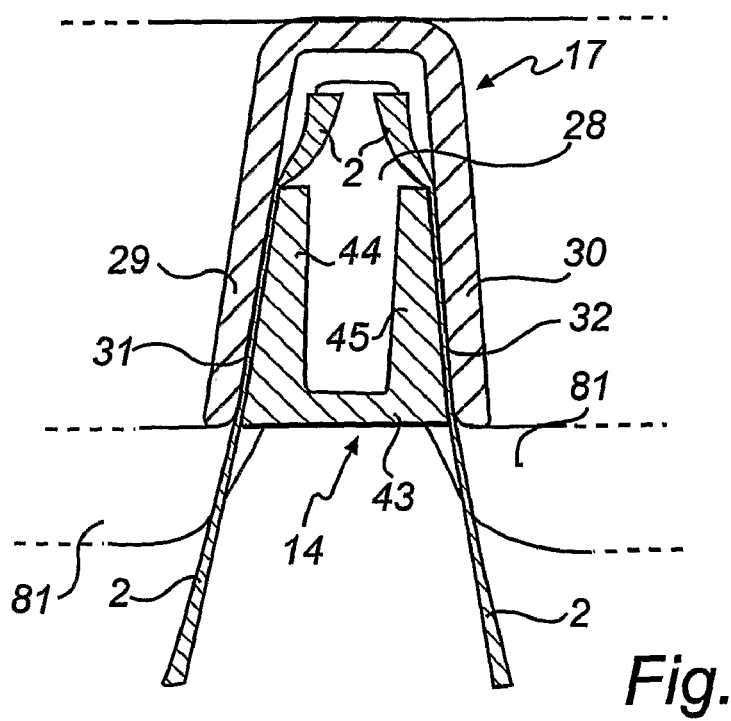
FIG. 8 is a schematic view similar to that of FIG. 7 but taken separated from a locking position.
Figure 9:
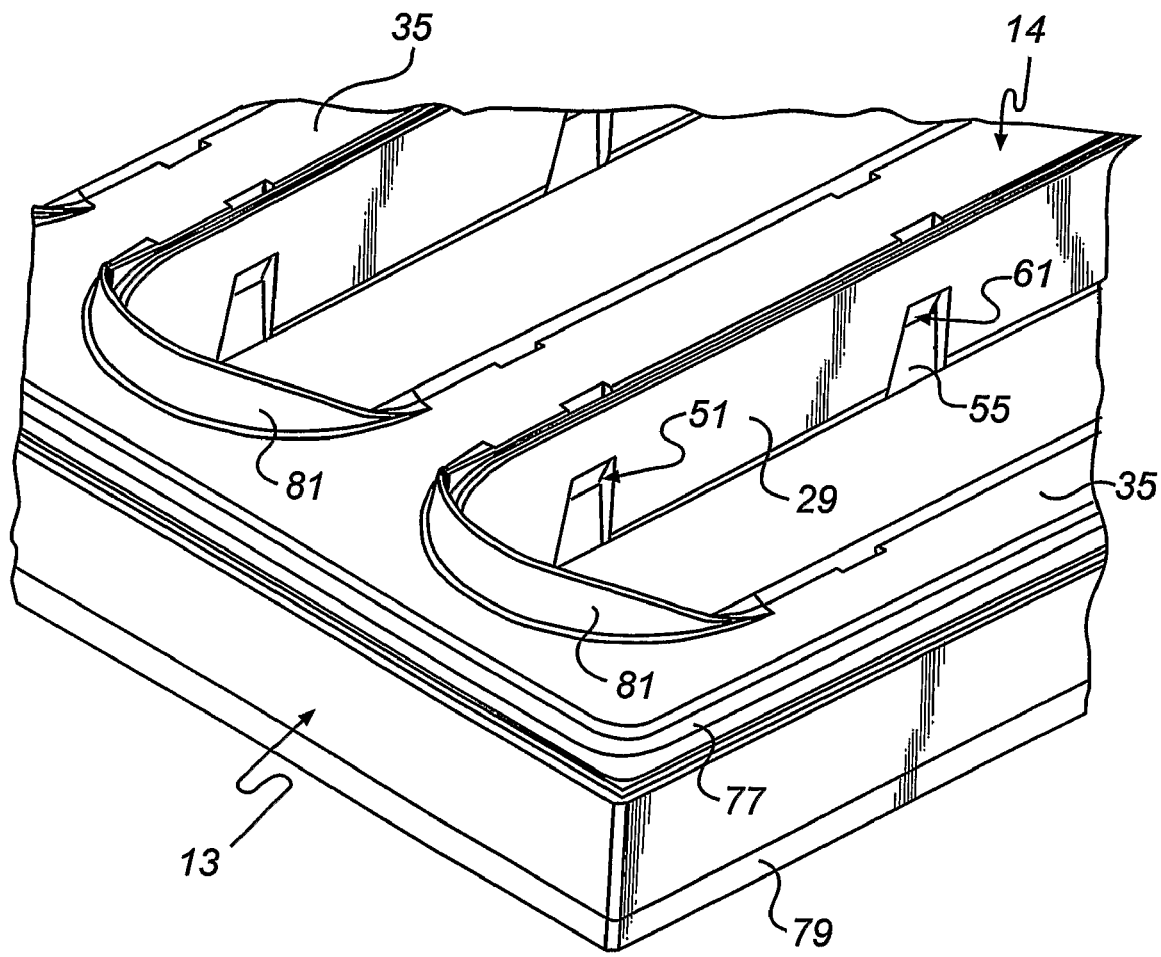
FIG. 9 is a schematic partial perspective view of the frame structure, that is, without filter pockets, of the embodiment of FIGS. 1-8, taken from the downstream side.

With reference now to FIGS. 7 and 8, the rib portions 17 of the outer subframe 13 have a symmetric design with a downwardly (as hereinbefore defined) expanding or diverging interior space 27 due to two diverging side walls or limbs 29,30, the inner wall surfaces 31,32 defining the space for receiving the corresponding portion of the inner subframe 14 and filter pocket mouth portions positioned and clamped therebetween. The interlocking between the subframes (FIG. 7) will be described later on.

With regard to the inner subframe 14, as previously indicated it is designed in correspondence to the outer subframe 15,16,17 such that it can be received within the interior spaces of the outer subframe while giving the necessary filter pocket clamping effect. Thus, the inner subframe also has both peripheral and rib subframe portions, all comprising a base from which filter pocket clamping portions project upwards, that is, upstreams, into said interior spaces.

With regard to the peripheral portions of the inner subframe, cf. FIGS. 5 and 6, they comprise a peripheral base 35 and an upwards projecting clamping flange 37 for co-operation with the sloping inner wall surface 25 of interior space 23 of the associated peripheral portion 16 of outer subframe 13. Flange 37 projects from the inner edge of base 35 and has a clamping surface sloping in correspondence to the sloping of the associated wall or limb 27 of the peripheral portion 16 of outer subframe 13. It should be realised that flange 37 can be given a certain flexibility to be used when assembling the pocket filter assembly, as will be discussed later on.

At the opposite outer edge, base 35 is provided with an abutment portion 39 having a rectangular cross-section and received in a corresponding recess 41 in the free end of the outer wall or limb of peripheral portion 16 of the outer subframe 13.

With regard to the rib portions of the inner subframe 14, cf. FIGS. 7 and 8, they comprise a rib base 43 and two opposite clamping flanges 44,45 projecting upward from the edges of the rib base 43 for clamping cooperation with the sloping wall surfaces 31,32 of walls or limbs 29,30 of the associated rib portion 17 of the outer subframe 13. The clamping surfaces of the two flanges 44,45 slope towards each other in correspondence to the sloping of the associated sloping wall surfaces 31,32.

As should be realized, this design means a substantial reduction of material for the inner subframe while at the same time enabling a certain flexibility of flanges 44,45 when assembling the pocket filter assembly, as will be discussed later on.

The various figures and in particular FIGS. 6 and 8 clearly illustrate how the mouths of the filter pockets 2 are clamped and held between the various clamping surfaces of the co-operating opening portions of the outer and inner subframes. A further holding is obtained by means of the interlocking of the subframes to each other as will now be described.

The outer and inner subframes 13,14 are interlocked to each other only at a number of locking positions, schematically indicated by reference numeral 4 in FIG. 1. Locking positions 4 are uniformly distributed along each pocket opening 3, that is, along both longitudinal sides of each pocket opening 3. The rounded ends of the pocket openings lack locking positions 4, since in the embodiment shown, the pocket openings 3 are relatively narrow. In this case, the longitudinal distance between two locking position is of the same order as the width of the pocket openings. However, the skilled man realizes that the number and distribution of locking positions will have to be decided on an individual basis for various pocket filter assemblies.

With specific reference to FIGS. 5,7,9 and 10, each locking position comprises locking elements including a locking projection on a portion of the inner subframe 14 and a co-operating locking hole in a co-operating portion of the outer subframe 13.

Each locking hole is a through-hole 51 in the associated wall or limb, such as 27 and 29,30, the holes being provided approximately at half the height of the wall or limb. The holes have a lower (as seen in the figures) flat abutment surface 53 that is undercut seen from the interior space 23,28 of the outer subframe portion in question. Since the outer subframe suitably has been moulded of plastics material, there is a clearence groove 55 above each hole 51. Also, there is an associated reinforcement of the outer subframe portion at each hole by means of a local increase of the wall or limb thickness above the hole, compensating for said hole and groove 55.

Each locking projection is from the upper free end of the associated clamping flange, such as 37,44,45, of the inner subframe 14. Each projection projects sideways and has the form of a hook 61 having a flat undercut abutment surface 63 adapted for co-operation with the corresponding abutment surface 53 of the associated hole 51. The size of hook 61 is adapted to the size of the hole, that is, somewhat smaller than the size of the hole so that the hook can penetrate the hole while at the same time pushing filter pocket mouth material into and through the hole so that said material seals any clearence between the hook and the hole. As readily understood the interlocking obtained, in addition to interconnecting the outer and inner subframes to each other in a very efficient and secure way, also gives an extra holding of the filter pocket mouth.

As evident from FIGS. 5 and 6, the frame structure of an assembly in accordance with the invention easily can be provided with both a front gasket and a rear gasket. Thus, the front surface, such as 21 and 22, of the peripheral outer subframe portions, has been provided with a circumferential groove 71 having a gasket 73 of foamed plastics material therein. A similar gasket 75 is provided in a circumferential groove 77 in the rear base surface of the associated peripheral inner subframe portion.

As also evident from FIGS. 5 and 6, the peripheral subframe portions only have locking positions at the side facing inwards, that is, away from the circumferential frame structure side. This means that the outer wall or limb of the peripheral outer subframe portions, such as 15,16, can be designed so as to give excellent frame stability, possibility to use outer side surface for sealing purposes, and possibility to pile outer subframes on top of each other in connection with manufacturing, storing and handling before assembling into pocket filter assemblies.

Figure 10:
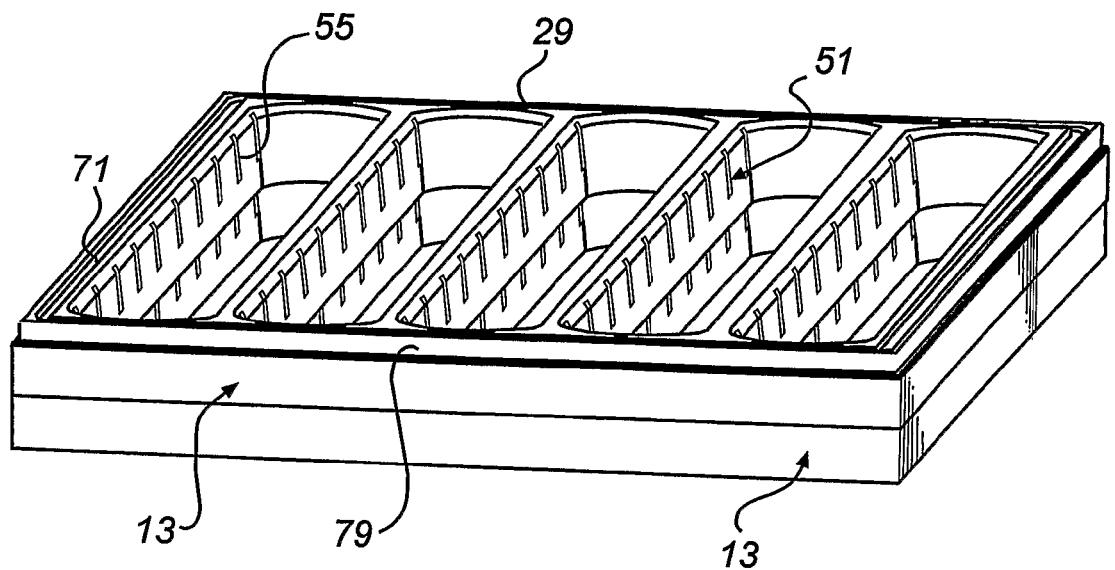
FIG. 10 is a schematic perspective view of two outer subframes of an embodiment having a different number of filter pockets, positioned one upon the other, front or upstream side facing upwards.
Figure 12:
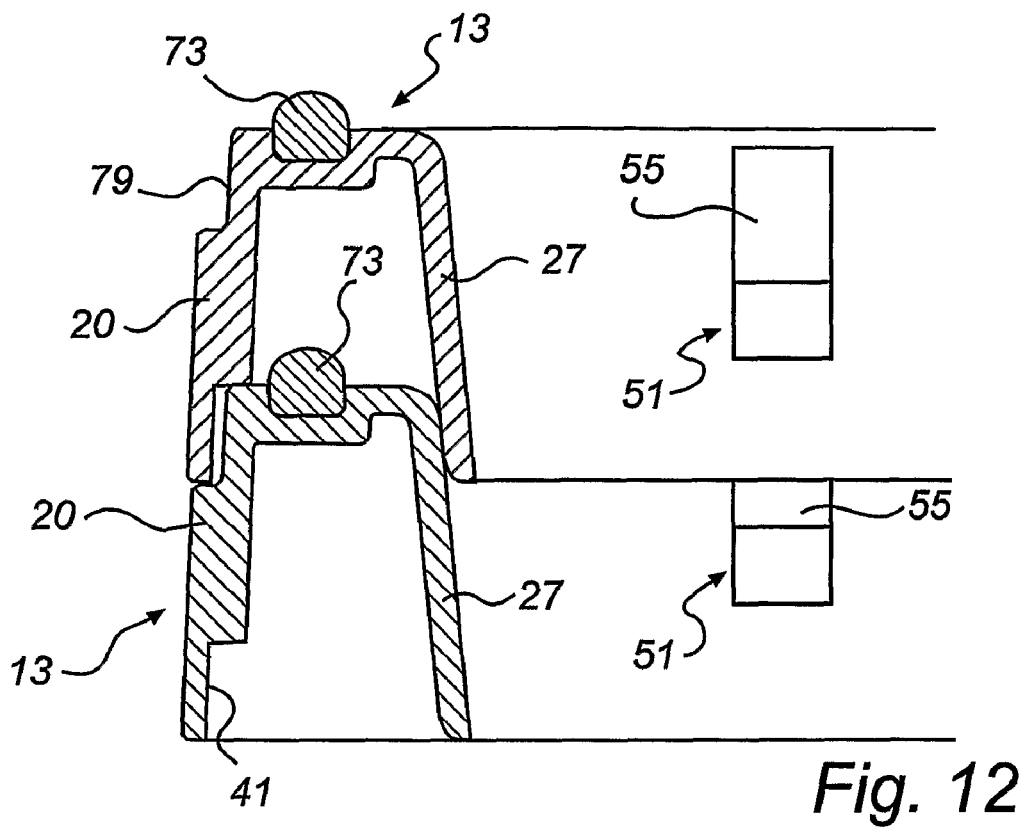
FIG. 12 is a schematic partial cross-sectional view of the outer subframes of FIG. 10, taken through the curved end portions of the filter pocket openings.

With regards to piling, as shown in FIGS. 5 and 6, the peripheral outer subframe portion 16 advantageously is provided with an outer upper side recess 79 at the front supplementary to recess 41, which in combination with the diverging nature of the interior spaces of the peripheral and rib portions of the outer subframe enables an efficient piling of outer subframes as is schematically illustrated in FIGS. 10 and 12, illustrating an embodiment of the invention similar to that of FIGS. 1-9 but with a different number of filter pockets.

Figure 11:
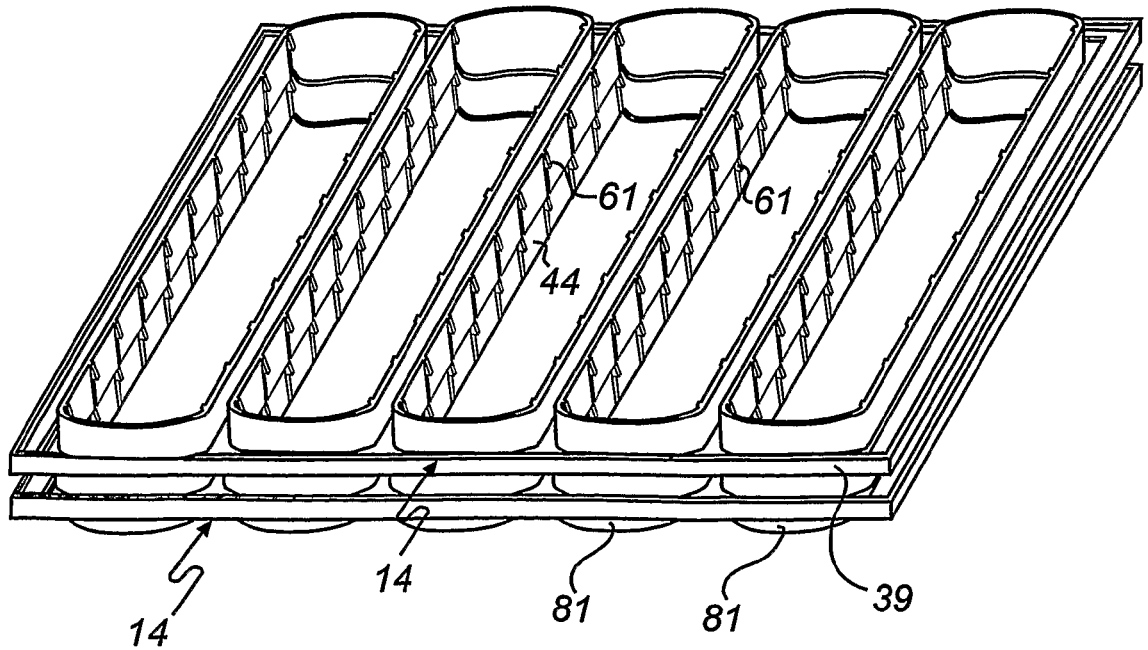
FIG. 11 is a schematic perspective view of two inner subframes of an embodiment as in FIG. 10, positioned one upon the other, upstream side facing upwards.
Figure 13:
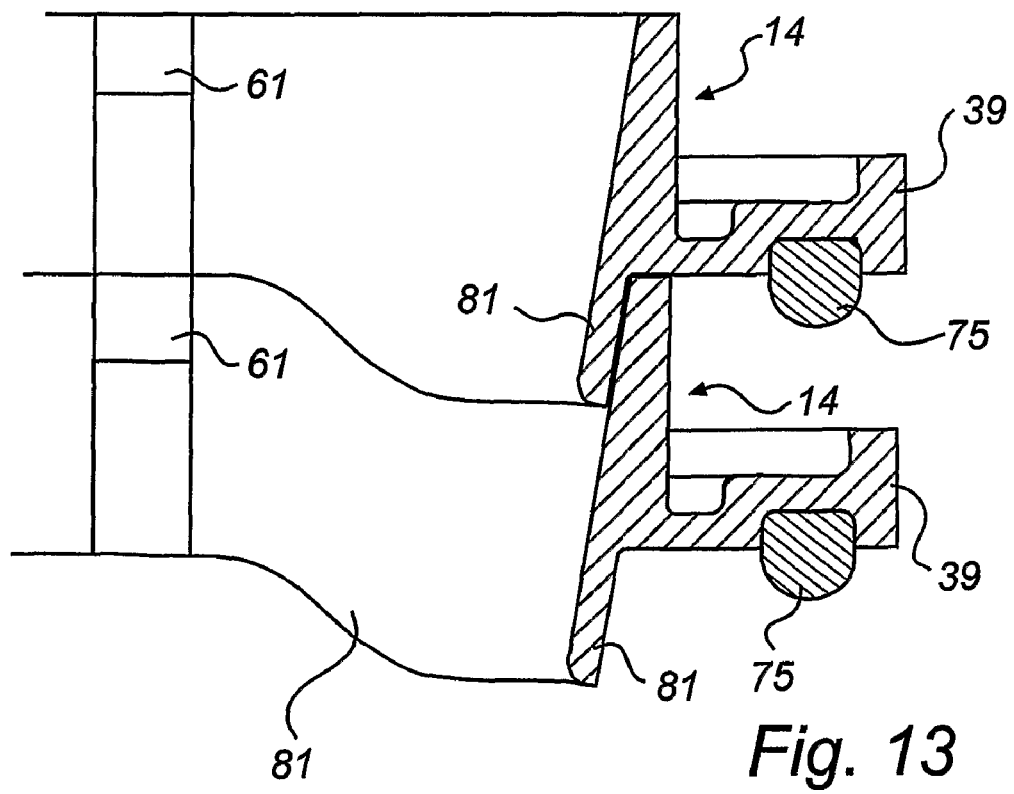
FIG. 13 is a schematic partial cross-sectional view of the inner subframes of FIG. 11, also taken through the curved end portions of the filter pocket openings.

With regard to the inner subframe, as illustrated in the various figures, it is advantageous, to provide the inner subframe with an integrated curved skirt 81 at each rounded pocket opening end 3. Skirts 81 project downstreams from the base of the inner subframe 14 and give support for the pocket mouths at said ends 3. In, addition, the skirts enable an efficient piling also of inner subframes 14 while gasket 75 is still setting, giving the same piling advantages as mentioned with regard to the outer subframe. This is schematically illustrated in FIGS. 11 and 13, relating to an embodiment as in FIGS. 10 and 12.

As is obvious to the man skilled in the art, a pocket filter assembly according to the invention can be assembled in a very efficient way starting from a configuration generally as outlined in FIG. 3. Suitably the filter pockets 2 and the outer subframe 13 are engaged so that the mouths of the filter pockets are located within the interior spaces of the associated outer subframe portions, whereafter the inner subframe 14 from behind is brought into engagement with the outer subframe 13 while the filter pockets pass through the filter pocket openings of the inner subframe.

When the inner subframe flanges having locking hooks thereon enter the interior spaces of the outer subframe defined by the walls or limbs having the locking holes, said walls or limbs and/or said flanges flex until the hooks enter the holes while pushing intermediate filter pocket material into the holes. Once the hooks have snapped into locking engagement with the holes, the subframes are firmly and securely interlocked to each other in a completely air or gas-tight manner.

Figure 14:
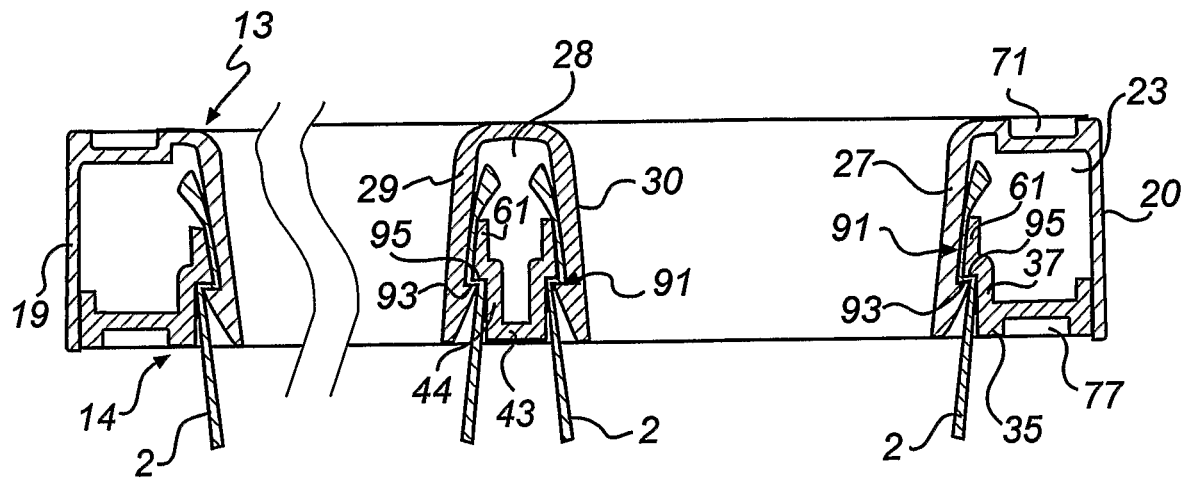
FIG. 14 is a schematic cross-sectional view similar to FIG. 4 but of an other embodiment of a pocket filter assembly according to the invention.
Figure 15:
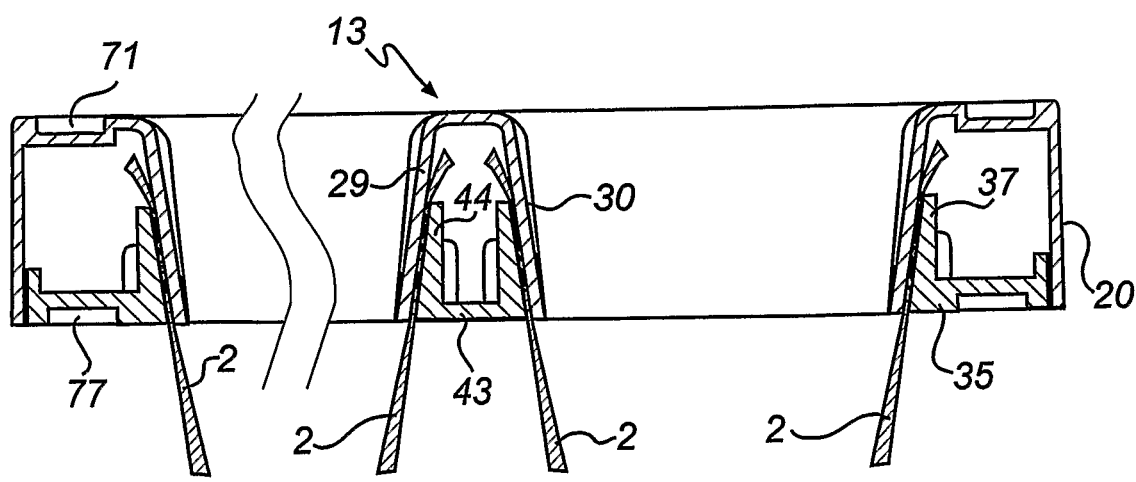
FIG. 15 is a schematic cross-sectional view of the embodiment of FIG. 14, taken separated from the locking positions.

FIGS. 14 and 15 schematically illustrate an embodiment of a pocket filter assembly according to invention, having modified locking elements, wherein parts corresponding to those of FIGS. 1-13 have been denoted by same reference numerals.

The main difference between the embodiment of FIGS. 14 and 5 and the embodiments of FIGS. 1-13 is that the locking through-holes 51 in the outer subframe 13 have been replaced by locking recesses 91 in the inner wall surface of the associated rib limb 27,29,30, each providing a locking abutment surface 93 for a co-operating hook surface 95 on the associated flange 37,44 of the inner subframe. In the embodiment shown, the co-operating surfaces 93 and 95 are not undercut, but the skilled man realizes that they could be undercut if a more secure interlocking is desired.

As also should be realized, the embodiment illustrated in the FIGS. 14 and 15 might be considered an embodiment in which locking apertures or recesses are provided in the inner subframe, that is, defined by surfaces 95, and in which locking projections are provided on the outer subframe, that is, defined by surfaces 93 on the hook-shaped lower end of limbs 27,29,30 of the outer subframe. As readily understood, this aspect can be elaborated by further modifying the co-operating portions of the inner and outer subframes.

The invention claimed is:

1. A pocket filter assembly for removing contaminants, the pocket filter assembly including a frame structure having a plurality of filter pocket openings and a corresponding plurality of filter pockets, each filter pocket having a pocket mouth sealed in a corresponding filter pocket opening, wherein
the frame structure includes an outer subframe and a corresponding inner subframe, the outer and inner subframes being connected and locked to each other by locking elements at a plurality of locking positions along two longitudinal sides of each filter pocket opening and along opening portions of the subframes defining the filter pocket openings, the outer subframe being hollow and the inner subframe being received within the hollow outer subframe;
the filter pocket mouths are clamped and sealed between co-operating opening portions of the subframes, the clamped portions of the filter pocket mouths extending in a direction of air or gas flow through the corresponding filter pocket opening; and
said locking elements, at each locking position on said co-operating opening portions of the subframes, include a projection on one of the subframes and a co-operating receiving aperture on the other of the subframes such that an interlock of the subframes to each other is obtained, a filter pocket mouth material of the associated filter pocket being between said projection and said receiving aperture such that said interlock is sealed thereby.

2. The pocket filter assembly as defined in claim 1, wherein the filter pocket openings of the hollow outer subframe are defined by channel portions of the subframe receiving corresponding portions of the inner subframe co-operating with the walls of said channel portions while clamping clamped portions of the filter pocket mouths therebetween.

3. The pocket filter assembly as defined in claim 1, wherein the interlocking between the subframes is of a non-detachable form-fit or undercut nature, involving a snapping action.

4. The pocket filter assembly as defined in claim 1, wherein the filter pocket material sealing each said interlock is between the associated projection and co-operating aperture.

5. The pocket filter assembly as defined in claim 1, wherein said receiving apertures are in the outer subframe and said projections are on the inner subframe.

6. The pocket filter assembly as defined in claim 1, wherein said locking elements are the sole locking elements for connecting and locking the subframes to each other.

7. The pocket filter assembly as defined in claim 1, wherein at least the outer subframe or both the subframes are in one piece.

8. The pocket filter assembly as defined in claim 1, wherein the frame structure is substantially flat, the outer subframe including frame portions having a U-shaped cross section with an interior space that opens facing downstreams and receiving co-operating frame portions of the inner subframe, at least one of the downstreams extending limbs of a said frame portion defining a filter pocket opening, the mouth of an associated filter pocket being clamped and sealed against the inner surface of said at least one limb.

9. The pocket filter assembly as defined in claim 8, wherein said frame portions of the outer subframe include non-peripheral rib-shaped frame portions and wherein the mouth of a first filter pocket is clamped and sealed against the inner surface of a said at least one limb of such a rib-shaped frame portion and the mouth of an adjacent filter pocket is clamped and sealed against the opposite other inner limb surface of such a rib-shaped frame portion.

10. The pocket filter assembly as defined in claim 1, wherein said projections each include a hook that co-operates with an associated receiving aperture.

11. The pocket filter assembly as defined in claim 10, wherein said hook is undercut.

12. The pocket filter assembly as defined in claim 11, wherein said receiving apertures each have an undercut abutment surface that co-operates with said undercut hook of an associated projection.

13. The pocket filter assembly as defined in claim 8, wherein said receiving apertures are in said at least one limb and said hooks project sideways from inner subframe portions received in said interior space of associated frame portions of the outer subframe.

14. The pocket filter assembly as defined in claim 13, wherein the inner subframe includes a base and flanges projecting upwards and into said interior space of associated frame portions of the outer subframe into contact with a co-operating inner limb surface while clamping a filter pocket mouth therebetween.

15. The filter pocket assembly as defined in claim 14, wherein said projections are hook projections provided at the free edge portions of said flanges.

16. The filter pocket assembly as defined in claim 13, wherein at least said at least one limb is resilient such that the inner subframe can be pushed into the outer subframe until said hooks snap into the associated receiving apertures.

17. The filter pocket assembly as defined in claim 1, wherein said the plurality of locking positions are along two opposite long sides of the filter pocket openings.

18. The filter pocket assembly as defined in claim 1, wherein the receiving apertures are through-holes.

19. The pocket filter assembly as defined in claim 1, wherein the frame structure has the form of a grating or a grid.

20. The pocket filter assembly as defined in claim 1, wherein the outer subframe has a circumferential peripheral groove on the inlet front side, a gasket being provided in the groove, and wherein the inner subframe has a circumferential peripheral groove on the rear outlet side, a gasket being provided in the groove.

21. The pocket filter assembly as defined in claim 1, wherein the outer subframe has a substantially flat peripheral side surface that is used as a sealing surface.

\* \* \* \* \*